(12) United States Patent  
Abou Assali

(10) Patent No.: US 9,560,090 B1  
(45) Date of Patent: Jan. 31, 2017

(54) METHODS, SYSTEMS, AND MEDIA FOR PROVIDING CONTENT

(71) Applicant: Google Inc., Mountain View, CA (US)

(72) Inventor: Cinthia Rodrigues Abou Assali, Paris (FR)

(73) Assignee: Google Inc., Mountain View, CA (US)

( * ) Notice: Subject to any disclaimer, the term of this patent is extended or adjusted under 35 U.S.C. 154(b) by 463 days.

(21) Appl. No.: 13/840,325

(22) Filed: Mar. 15, 2013

(51) Int. Cl.
*G06F 15/17* (2006.01)
*H04L 29/06* (2006.01)

(52) U.S. Cl.
CPC .................................. *H04L 65/403* (2013.01)

(58) Field of Classification Search
USPC .......................................................... 709/204
See application file for complete search history.

(56) References Cited

U.S. PATENT DOCUMENTS 8,683,063 B1 * 3/2014 Reeves ............... H04L 63/1441
709/224
9,065,836 B1 * 6/2015 Frank .................... H04L 63/104
2010/0262435 A1 * 10/2010 Smith ..................... G06Q 10/10
705/3
2013/0139043 A1 * 5/2013 Patel ................. G06F 17/30893
715/205
2013/0238777 A1 * 9/2013 Raleigh ............... H04L 67/1097
709/223

* cited by examiner

*Primary Examiner* — Ario Etienne
*Assistant Examiner* — Sm Z Islam
(74) *Attorney, Agent, or Firm* — Byrne Poh LLP

(57) ABSTRACT

Methods, systems, and media for providing content are provided. In some implementations, methods for providing content are provided, the methods comprising: identifying, using a hardware processor, a first content provider; identifying a second content provider affiliated with the first content provider; identifying an item of content associated with the second content provider, and determining that the content item meets one or more parameters of the first content provider and that the content item meets one or more parameters of the second content provider; and in response to determining that the content item meets one or more parameters of the first content provider and that the content item meets one or more parameters of the second content provider, presenting the content item to a user.

24 Claims, 5 Drawing Sheets

METHODS, SYSTEMS, AND MEDIA FOR PROVIDING CONTENT

TECHNICAL FIELD

The disclosed subject matter relates to methods, systems, and media for providing content.

BACKGROUND

Content sharing platforms, such as video sharing web sites, web logs, social networks, etc., have seen explosive growth in recent years. Central to these platforms is the participation of a user, called a content provider (which can be an ordinary user), creating and providing to the platform media content to be shared with other users. Subsequently to the content provider providing the media content to the platform, other users can gain access to the media content for entertainment, education, or business purposes.

In some instances, the other users can gain access to a content provider's media content by accessing a page of the content provider. Also, when a user of some of these platforms is interested in receiving new media content from the content provider in the future, the user can subscribe to the content provider's media content. This subscription can then cause the user to automatically receive new media content in response to it being provided to the platform.

While a content provider may originate media content to be presented to those who visit the content provider's page or to those who subscribe to the content provider's media content, in some instances a content provider may wish to share content that was originated by another content provider. In some instances to facilitate such sharing, a content provider may provide a hyperlink on the content provider's page to another content provider's media content. In many instances, however, such hyperlinking is prohibited on content sharing platforms because content providers do not wish others to share their content without authorization.

Accordingly, it is desirable to provide methods, systems, and media for providing content.

SUMMARY

In accordance with various implementations of the disclosed subject matter, methods, systems, and media for providing content are provided.

In accordance with some implementations of the disclosed subject matter, methods for providing content are provided, the methods comprising: identifying, using a hardware processor, a first content provider; identifying a second content provider affiliated with the first content provider; identifying an item of content associated with the second content provider; determining that the content item meets one or more parameters of the first content provider and that the content item meets one or more parameters of the second content provider; and in response to determining that the content item meets one or more parameters of the first content provider and that the content item meets one or more parameters of the second content provider, presenting the content item to a user.

In accordance with some implementations of the disclosed subject matter, systems for providing content is provided, the system comprising: a hardware processor configured to: identify a first content provider; identify a second content provider affiliated with the first content provider; identify an item of content associated with the second content provider; determine that the content item meets one or more parameters of the first content provider and that the content item meets one or more parameters of the second content provider, and present the content item to a user in response to determining that the content item meets one or more parameters of the first content provider and that the content item meets one or more parameters of the second content provider.

In accordance with some implementations of the disclosed subject matter, systems for providing content is provided, the systems comprising: means for identifying a first content provider; means for identifying a second content provider affiliated with the first content provider; means for identifying an item of content associated with the second content provider; means for determining that the content item meets one or more parameters of the first content provider and that the content item meets one or more parameters of the second content provider, and means for presenting the content item to a user in response to determining that the content item meets one or more parameters of the first content provider and that the content item meets one or more parameters of the second content provider.

In some implementations, the system further comprises means for presenting the content item based on a subscription relationship between the user and the first content provider.

In some implementations, the system further comprises means for presenting the content item based on the user visiting a web page associated with the first content provider.

In some implementations, the content item is a video.

In some implementations, the system further comprises means for indicating to the user that the content item from the second content provider is being presented based on the affiliation between the first content provider and the second content provider.

In some implementations, the one or more parameters of the first content provider includes an indication of whether to share content provided by the second content provider.

In some implementations, the one or more parameters of the second content provider includes an indication of whether to provide content to the first content provider.

In some implementations, the one or more parameters of the second content provider includes an indication of content items to provide to the first content provider.

In accordance with some implementations of the disclosed subject matter, non-transitory computer-readable media containing computer executable instructions that, when executed by a processor, cause the processor to perform methods for providing content are provided, the method comprising: identifying a first content provider; identifying a second content provider affiliated with the first content provider; identifying an item of content associated with the second content provider; determining that the content item meets one or more parameters of the first content provider and that the content item meets one or more parameters of the second content provider; and in response to determining that the content item meets one or more parameters of the first content provider and that the content item meets one or more parameters of the second content provider, presenting the content item to a user.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which include methods, systems, and media) for providing content are provided.

In some implementations, these mechanisms can provide a user with content from a second content provider when a request is received from the user for content from a first content provider based on an affiliation between the first content provider and the second content provider. For example, if the user is a subscriber to content from the first content provider, content from content providers that are affiliated with the first content provider (which can be referred to as affiliated content providers) can be presented to the user along with the content that the user requested from the first content provider. In a particular example, if a user subscribes to a video channel of a first content provider on a video sharing service, the user can be provided with content from a channel of a second content provider among the content from the first content provider.

In some implementations, particular items of content to be provided from affiliated content provider(s) can be based on one or more parameters of the first content provider and one or more parameters the affiliated content provider(s) that are associated with the first content provider. For example, the first content provider can limit the number of content items presented from a particular affiliated content provider, or limit the content items presented from particular affiliated content providers to only the most popular content items from a particular provider.

If a particular content item from an affiliated content provider meets the parameter(s) for the first content provider and the parameter(s) for the affiliated content provider, the content item can be presented to the user with content items from the first provider. Content items that are provided from an affiliated content provider can be identified as such to the user.

Figure 1:
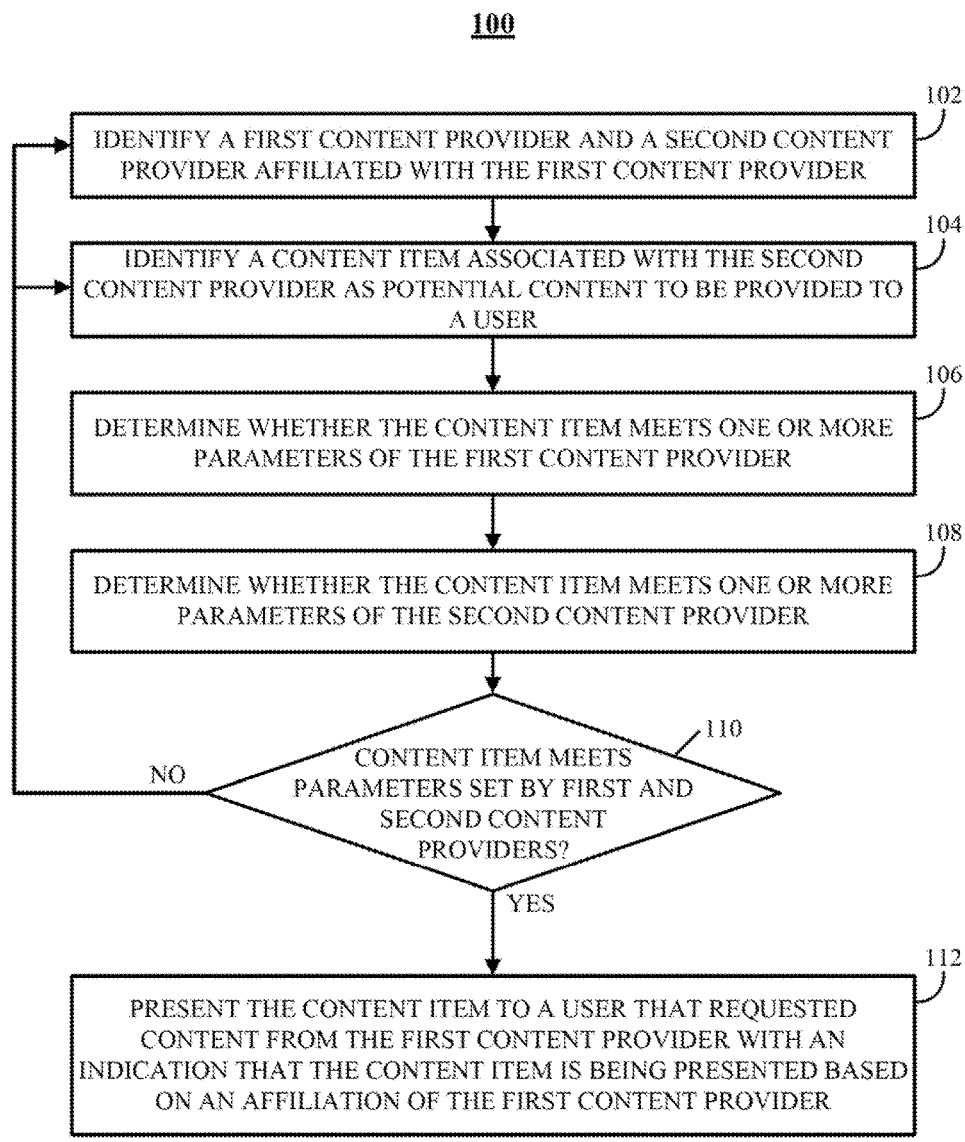
FIG. 1 shows an example of a process for providing content in accordance with some implementations of the disclosed subject matter.

Turning to FIG. 1, an example 100 of a process for providing content is shown in accordance with some implementations of the disclosed subject matter. As illustrated, at 102, process 100 can identify a first content provider and a second content provider affiliated with the first content provider. The first content provider and the second content providers can be any suitable content providers.

In some implementations, the first content provider can be a user of a video sharing service (or video hosting service). In such implementations, the video sharing service can receive videos uploaded or otherwise transmitted by the first content provider and make the videos of the second content provider available to other users (e.g., viewers) of the video sharing service. The second content provider can be another user of the video sharing service, and the video sharing service can make the videos available to other users (e.g., viewers) of the video sharing service. Such a video sharing service can assign each content provider a page on the service where videos shared by the content provider are made available for viewing by other users of the service.

Additionally, the video sharing service can enable users of the video sharing service (that may or may not be content providers) to view videos provided by content providers. As used herein, when a user is using the video sharing service to view videos, the user is sometimes referred to as a viewer, but it is recognized that a viewer can also be a content provider and vice versa.

In some implementations, the video sharing service can receive a request from a viewer to be provided with content and/or content updates from a particular content provider. Such a request is sometimes referred to herein as a subscription. In response to a user subscribing to a particular content provider, the video sharing service can present content and/or updated content (e.g., content for which the video sharing service has not yet received a request to play from the viewer) in a page assigned to the viewer.

Although the mechanisms described herein are generally discussed as being applied to a video sharing service, it is recognized that these mechanisms can be used in a variety of applications. For example, a content provider can be a user of a social networking site, in which the social networking site can receive content from the content provider such as text, images, videos, etc., and can make this content available to other users of the social network. As another example, the content provider can be a user of a web log service that facilitates a user in publishing content on a web page, or the like. As yet another example, the content provider can be a publisher of a web page. In some implementations, the first content provider can be a user of a first service, such as a video sharing service, and the second content provider can be a user of a second service, such as a social networking site.

In some implementations, content providers can be any suitable content provider which can include, without limitation, a person or group of people, an organization such as a corporation or non-profit organization, a sub-unit of an organization (e.g., a division of a corporation, a department of non-profit organization), or any other entity that may provide content.

In some implementations, the second content provider can be affiliated with the first content provider using any suitable technique(s). For example, as described below in connection with FIG. 3, a request to be affiliated with the second content provider can be received from the first content provider, and the second content provider can transmit a response to the request. As another example, the first content provider can be a subscriber, or the like, of the second content provider and a request can be received to present content items from the second content provider with content items from the first content provider.

Figure 2:
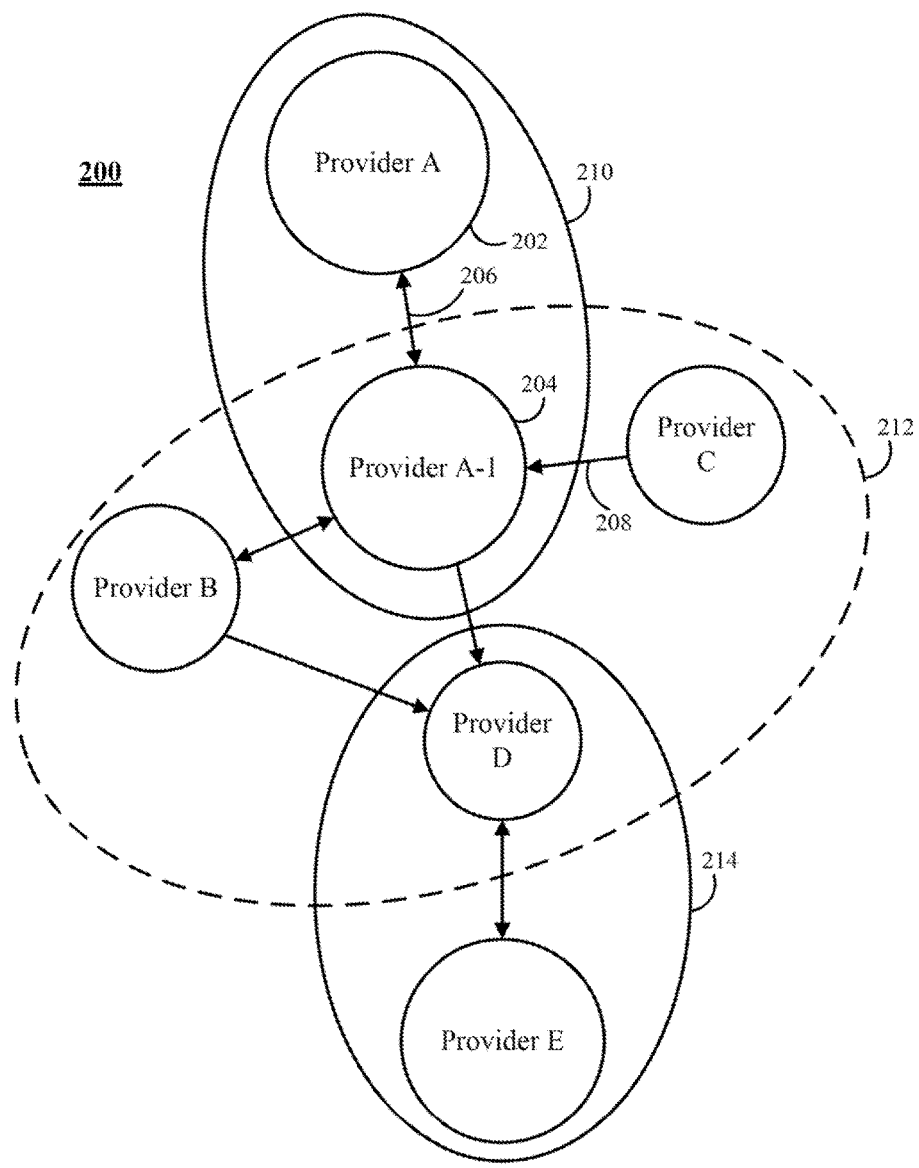
FIG. 2 shows an example of a diagram showing affiliated content providers in accordance with some implementations of the disclosed subject matter.

FIG. 2 shows an example 200 of a diagram showing affiliations between content providers in accordance with some implementations of the disclosed subject matter. In the example shown in FIG. 2, various content providers have been affiliated with one another in various different affiliations. In example 200, providers are shown as circles of various sizes, where the size of the circle can correspond to one or more parameters of the content provider. For example, the size can correspond to a content provider's popularity (e.g., a content provider with more subscribers, more views of the provider's content, more referrals, more affiliated content providers, etc.) with a bigger circle denoting a more popular provider. As another example, the size can correspond to a volume of content provided by a content provider (e.g., number of items of content, total length of content, etc.). Arrows in the example can show affiliations between providers, where an arrow pointing to a provider can denote that the provider has agreed to present content from the provider which the arrow is pointing from. In a more particular example, a provider 202 (Provider A) is shown as being affiliated with provider 204 (Provider A-1) by arrow 206. As shown, arrow 206 is bi-directional and, therefore, denotes that Provider A has agreed to present content from Provider A-1 and vice versa. An arrow having only one point, such as arrow 208 between Provider C and Provider A-1 can denote that content is only flowing in one direction from Provider C to Provider A-1.

In a more particular example, Provider A can be an apparel company that specializes in providing athletic equipment and apparel, and Provider A-1 can be a division of the company that further specializes in providing soccer equipment and apparel. In the example shown in FIG. 2, the content provider associated with the parent company (Provider A) can be managed independently from the content provider associated with the division specializing in soccer (Provider A-1), such that soccer specific content can be provided by Provider A-1, and more general content can be provided by Provider A. Provider B, Provider C, and Provider D can be soccer related content providers in this example, such as soccer teams, soccer leagues, a sports focused television network (or a division of a sports focused television network) devoted to soccer, web sites or web pages devoted to soccer, etc. In a particular example, Provider D can be a soccer league based in a particular region, and Provider E can be an advertiser sponsor of the soccer league that is associated with Provider D.

In some implementations, content providers that are directly affiliated or share a common affiliation (e.g., are all affiliated with the same content provider) can be grouped into a network of content providers. For example, as illustrated in FIG. 2, the content providers are grouped into three networks based on affiliation: network 210, which includes Provider A and Provider A-1; network 212, which includes Provider A-1, Provider B, Provider C, and Provider D; and network 214, which includes Provider D and Provider E.

In some implementations, a viewer can subscribe to individual providers (e.g., Provider A-1, Provider B, etc.) and/or a viewer can subscribe to a provider network (e.g., network 212) of affiliated providers. Additionally or alternatively, a provider network page can be assigned by a video sharing service, where a viewer can be presented with content from all providers in a network (e.g., network 210).

Referring back to FIG. 1, as illustrated at 104, process 100 can identify a content item associated with the second content provider as potential content to be provided to a user that requests content from the first content provider. Any suitable technique(s) can be used to identify a content item associated with the second content provider to be used as potential content to be presented to a user. For example, a most recent content item associated with the second content provider can be identified. As another example, a most popular content item associated with the second content provider can be identified. As yet another example, a featured content item associated with the second content provider can be identified. As still another example, a content item meeting criteria (e.g., based on topic, length, popularity, etc.,) specified by the first content provider can be identified.

At 106, process 100 can determine whether the content item identified at 104 meets one or more parameters set by the first content provider. These parameters can include recency of the content item (e.g., how recently the content item was made available by the second content provider), popularity of the content item, number of content items already provided from the second content provider (e.g., the first content provider can set how many content items can be provided from the second content provider to a user that requests content from the first content provider, etc.). Parameters that can be set by the user are further described below in connection with FIG. 3.

At 108, process 100 can determine whether the content item identified at 104 meets one or more parameters of the second content provider. The parameters of the second content provider can be similar to the parameters of the first content provider, and any other suitable parameters. For example, the parameters of the second content provider can include recency of the content item, popularity of the content item, topic of the content item, whether the content item has been presented by another content provider (e.g., a third content provider that is affiliated with at least the second content provider), whether the content is included in a category of content that the second content provider has indicated is not to be presented by other content providers, etc.

At 110, process 100 can determine whether the content item identified at 104 meets the parameters of both the first content provider and the parameters of the second content provider. If process 100 determines that the potential content item does not meet the parameters set by the first content provider and/or the second content ("NO" at 110), process 100 can either return to 104 and identify another item of content from the second content provider, or return to 102 to identify a different second content provider.

Otherwise, if process 100 determines that the potential content item meets the parameters set by the first content provider and the second content ("YES" at 110), process 100 can proceed to 112.

At 112, process 100 can cause the content item to be presented to a user (e.g., a viewer) that requests content from the first content provider. In some implementations, process 100 can cause the content item from a second content provider that the user has not requested content from to be presented with an indication that the content item is being presented to the user based on an affiliation of the first content provider. Additionally, such an indication can identify a source of the content item as being a second content provider. For example, referring to example 200 shown in FIG. 2, if a user requests content from Provider E, the user may be presented with one or more content items from Provider D based on the affiliation between the content providers and parameters set by Provider D and Provider E regarding the affiliation between the two content providers. In such an example, content items presented to the user from Provider D can be differentiated as being content that is presented as an "update from a connected content provider." Additionally, these content items can be identified based on the content provider that the content item originated from (e.g., "update from connected content provider Provider D"). An identification that the second content provider belongs to a particular network to which the first content provider also belongs can be presented to the user such as "update from connected content provider Provider D, part of the Provider E network."

In some implementations, process 100 can cause the user to be presented with an option to subscribe to the second content provider based on the content item presented and/or to subscribe to the network to which both the first content provider and second content provider are a part of.

In some implementations, content items identified at 104 that are determined to meet first content provider parameters and second content provider parameters (e.g., "YES" at 112), can be inhibited from being presented to users that requested content from the first content provider until process 100 receives an indication from a user associated with the first content provider (e.g., an administrator of the first content provider's user account) to present the content item. Process 100 can hold all content items for approval by the first content provider, or alternatively can hold only content items that contain content that is considered sensitive (e.g., contains one or more words from a predetermined list of sensitive words).

In some implementations, process 100 can receive the request for content of a first content provider at 112 in any suitable form. For example, process 100 can receive the request from a browser application or the like as a request for a particular web page associated with the first content provider. As another example, process 100 can receive the request from a browser application or the like as a request for a particular web page associated with a user that has requested the content (e.g., a page that contains updates from all content providers that the user has subscribed to). As yet another example, process 100 can receive a request to email updated content to the user as the content is provided by the first content provider. As still another example, process 100 can receive a request to provide updates from the first content provider to the user as part of a Rich Site Summary (RSS) feed that the user has requested be delivered to a program or service that presents content provided in an RSS feed to users.

In some implementations, process 100 can identify a designated number of content items (e.g., two, three, four, etc.) to present from affiliated content providers, or a number of content items to present from affiliated content providers as a percentage of content items to be presented from the first content provider (e.g., ten percent, fifteen percent). In such an implementation, process 100 can be repeated until a predetermined number of content items have been identified to present in response to a user requesting content from the first content provider. Additionally, if a first content provider is affiliated with various second content providers, content items can be provided to the user from more than one second content provider, until a predetermined number of content items from second content providers are chosen for presentation to the user.

In some implementations, which content items to present to users that request content from the first content provider can be determined periodically (e.g., every minute, every fifteen minutes, every hour, every day, etc.), when a request has not been received to present content from the first content provider, and/or on any other suitable basis. Additionally or alternatively, content items to present when a request to present content of the first content provider is received from a user can be determined (e.g., by using process 100) when content of the first content provider is requested.

In some implementations, if process 100 determines that a user is a subscriber of a particular second content provider, and/or a network that includes the secondary content provider, presentation of content items from that particular second content provider as affiliated content items can be inhibited, as presentation of these content items may be redundant.

In some implementations, process 100 can present a user that requests content from the first content provider with an opportunity to inhibit presentation of content from affiliated content providers. For example, settings related to the user's account can include a setting for inhibiting display of content from affiliated content providers. As another example, when a user is presented with content from an affiliated content provider, the user can also be presented with a user interface item for inhibiting presentation of affiliated content from the particular content provider and/or all affiliated content. As yet another example, in some implementations, display of affiliated content can be inhibited unless a user request to display affiliated content is received.

Figure 3:
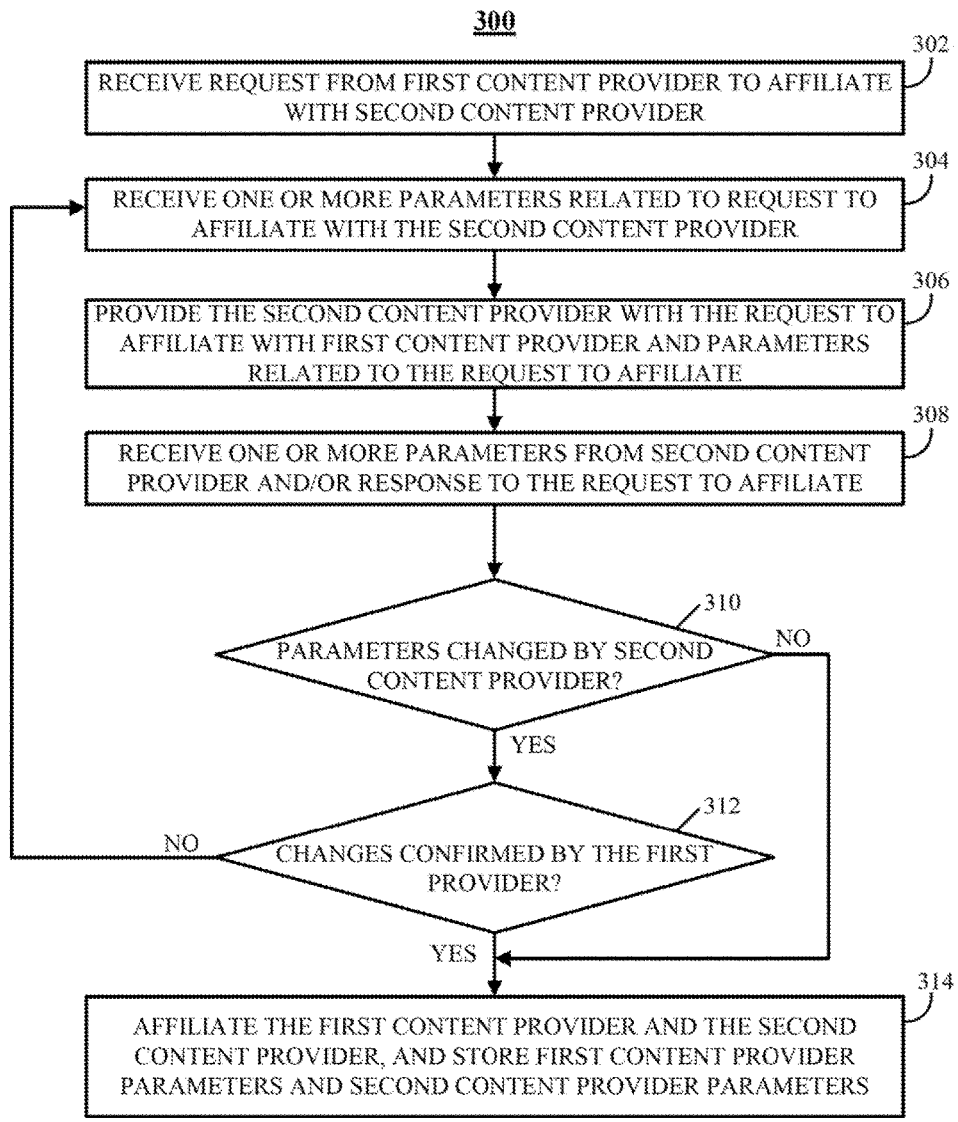
FIG. 3 shows an example of a process for creating an affiliation between content providers in accordance with some implementations of the disclosed subject matter.

FIG. 3 shows a process for determining the terms of an affiliation between a first content provider and a second content provider in accordance with some implementations of the disclosed subject matter. As illustrated, at 302, process 300 can receive a request from a first content provider to be affiliated with a second content provider. Such a request can be initiated in any suitable manner. For example, a request can be received in response selection of a user interface item (e.g., a button, a link, etc.) by the first content provider on a page associated with the second content provider or presented in association with a content item of the second content provider. In some implementations, process 300 can receive an indication from a content provider of criteria that other content providers must meet in order to request to be affiliated. For example, a content provider can be required to have a predetermined number of subscribers, a predetermined number of views, be a verified content provider (e.g., verified by the provider of a video sharing service), etc.

At 304, process 300 can receive one or more parameters related to the request to affiliate that was received at 302. Any suitable parameters can be included at 304, and in some implementations, process 300 can cause parameters that can be selected to be presented to the first content provider.

In some implementations, the one or more parameters can relate to a request that content of the second content provider be presented with content of the first content provider and/or relate to a request that content of the first content provider be presented with content of the second content provider. The parameters can also relate to a type (e.g., video, text, images, original content, shared content, etc.) of content to be provided to the first content provider and/or the second content provider. This can include, for example, a recency of content to be provided, popularity of content to be provided, topics of content to be provided, amount of content to be provided (e.g., how many items to be provided at one time), etc.

In some implementations, the one or more parameters related to the request can be received based on selections made by a user. Additionally or alternatively, process 300 can automatically select the one or more parameters based on default parameters associated with the first content provider. For example, process 300 can receive defaults set by the first content provider in a settings section of an account associated with the first content provider. Such defaults can be based on one or more criteria related to a second content provider that is the object of the request to affiliate, such as size, popularity, whether the second content provider is a verified user, etc.

At 306, process 300 can provide the second content provider with the request to affiliate and the parameters submitted by the first content provider. The request and parameters can be provided in any suitable form using any suitable technique(s). For example, process 300 can provide the second content provider with a message associated with the second content provider's user account that details the request and/or parameters submitted by the first content provider. Additionally or alternatively, process 300 can provide an email, text message, or the like, that details the request and/or parameters submitted by the first content provider.

At 308, process 300 can receive one or more parameters from the second content provider and/or a response to the request to affiliate. In some implementations, if the response is negative (e.g., an indication is received from the second content provider to deny or ignore the request), process 300 can end.

In some implementations, the one or more parameters of the second content provider can be received based on selections made by a user. Additionally or alternatively, process 300 can automatically select the one or more parameters based on default parameters associated with the second content provider. For example, process 300 can receive defaults set by the second content provider in a settings section of an account associated with the first content provider. Such defaults can be based on one or more criteria related to a first content provider that is making a request to affiliate, such as volume, popularity, whether the first content provider is a verified user, etc. Additionally, if the first content provider does meet a threshold criteria (e.g., a threshold volume, a threshold popularity, etc.), process 300 can automatically ignore and/or deny the request to affiliate. In such implementations, a message can be generated detailing the request to affiliate and any parameters received from the first content provider, but that does not require a response by the second content provider.

In some implementations, the parameters received from the second content provider can be similar to the parameters received from the first content provider at 304. Additionally or alternatively, the parameters provided by the second content provider can be indications of whether the received parameters are acceptable and/or can include additional parameters. In some implementations, any changes to parameters that were provided at 306 can be received as edits of the parameters received at 304.

At 310, process 300 can determine whether the parameters received at 308 include any changes with respect to the parameters received at 304. If process 300 determines that the second content provider changed any parameters ("YES" at 310), process 300 can proceed to 312. In some implementations, process 300 can consider only changes made to certain parameters, but not to others. For example, if an indication is received that the second content provider requested more items of content from the first content provider than requested by the first content provider (e.g., by accepting more types of content, more content items per week, etc.) this may not be considered a change.

At 312, process 300 can provide any changes made to the parameters (e.g., additions, deletions, edits, etc.) to the first content provider and can determine whether the first content provider accepts the changes made by the second content provider.

If process 300 determines that parameters were not changed by the second content provider ("NO" at 310), or if process 300 determines that the changes are accepted by the first content provider ("YES" at 312), process 300 can proceed to 314. Otherwise, if process 300 determines that the changes are not accepted by the first content provider ("NO" at 312), process 300 can return to 304 and prompt the first content provider to enter new parameters, or (not shown in FIG. 3) receive an indication from the first content provider to cancel the request for affiliation with the second content provider (not shown in FIG. 3).

At 314, process 300 can create an affiliation between the first content provider and the second content provider, and store the first content provider parameters related to content items of the second content provider to provide to users that request content from the first content provider from the second content provider, and vice versa (if applicable). Process 300 can also store second content provider parameters related to content items to provide to the first content provider's subscribers from the second content provider, and vice versa (if applicable).

In some implementations, the first content provider and/or second content provider can change the affiliation (e.g., cancel the affiliation) and/or change the terms of the affiliation (e.g., the parameters) at any time, which can be subject to approval by the other content provider of the affiliation.

Figure 4:
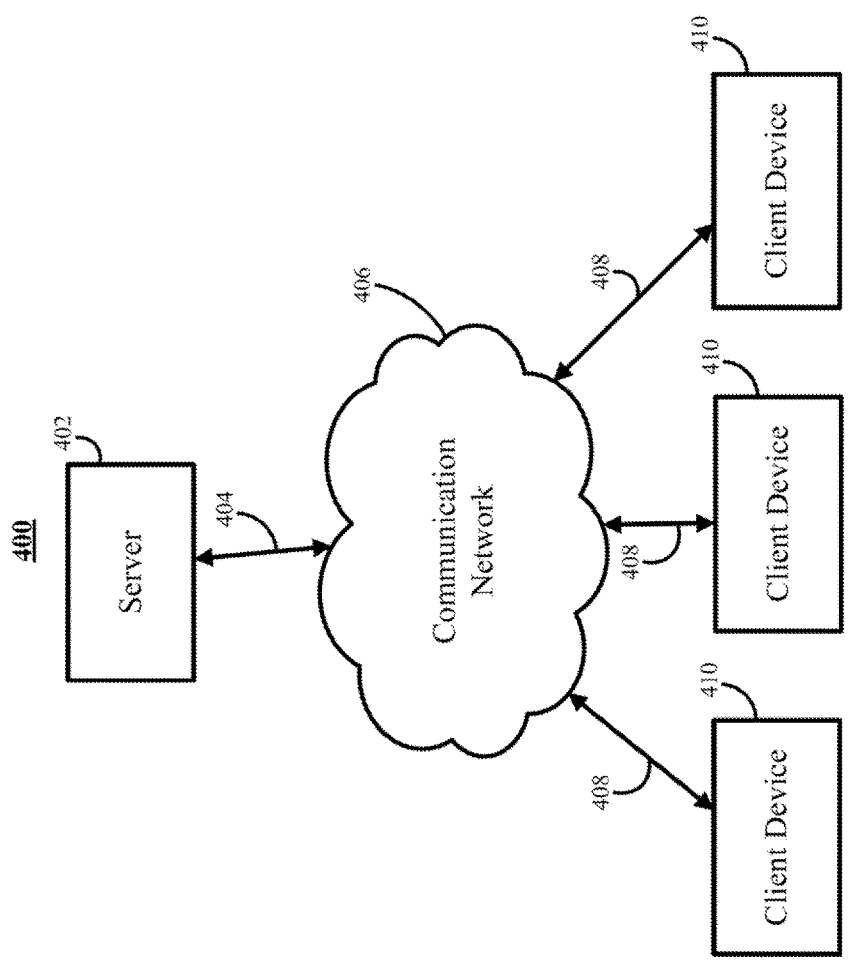
FIG. 4 shows a schematic diagram of an example system suitable for implementation of the mechanisms described herein for aggregating and presenting multiple videos in accordance with some implementations of the disclosed subject matter.

FIG. 4 shows an example 400 of a generalized schematic diagram of a system on which the mechanisms for providing content as described herein can be implemented in accordance with some implementations. As illustrated, system 400 can include one or more client devices 410. Client devices 410 can be local to each other or remote from each other. Client devices 410 can be connected by one or more communications links 408 to a communications network 406 that can be linked via a communications link 404 to server 402.

System 400 can include one or more servers 402. Server 402 can be any suitable server for providing access to the mechanisms described herein for providing content, such as a hardware processor, a computer, a data processing device, or any suitable combination of such devices. For example, the mechanisms for providing content can be distributed into multiple backend components and multiple frontend components and/or interfaces. In a more particular example, backend components, such as data collection and data distribution can be performed on one or more servers 402. In another particular example, frontend components, such as a user interface, data entry, video presentation, etc., can be performed on one or more client devices 410.

In some implementations, each of the client devices 410, and server 402 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, client device 410 can be implemented as a personal computer, a laptop computer, a smartphone, a wearable computer, a tablet computer, a gaming device, a server, etc., or any suitable combination thereof.

Communications network 406 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 404 and 408 can be any communications links suitable for communicating data among client devices 410 and server 402, such as network links, dial-up links, wireless links, hard-wired links, any other suitable communications links, or any suitable combination of such links. Client devices 410 and server 402 can be located at any suitable location.

Figure 5:
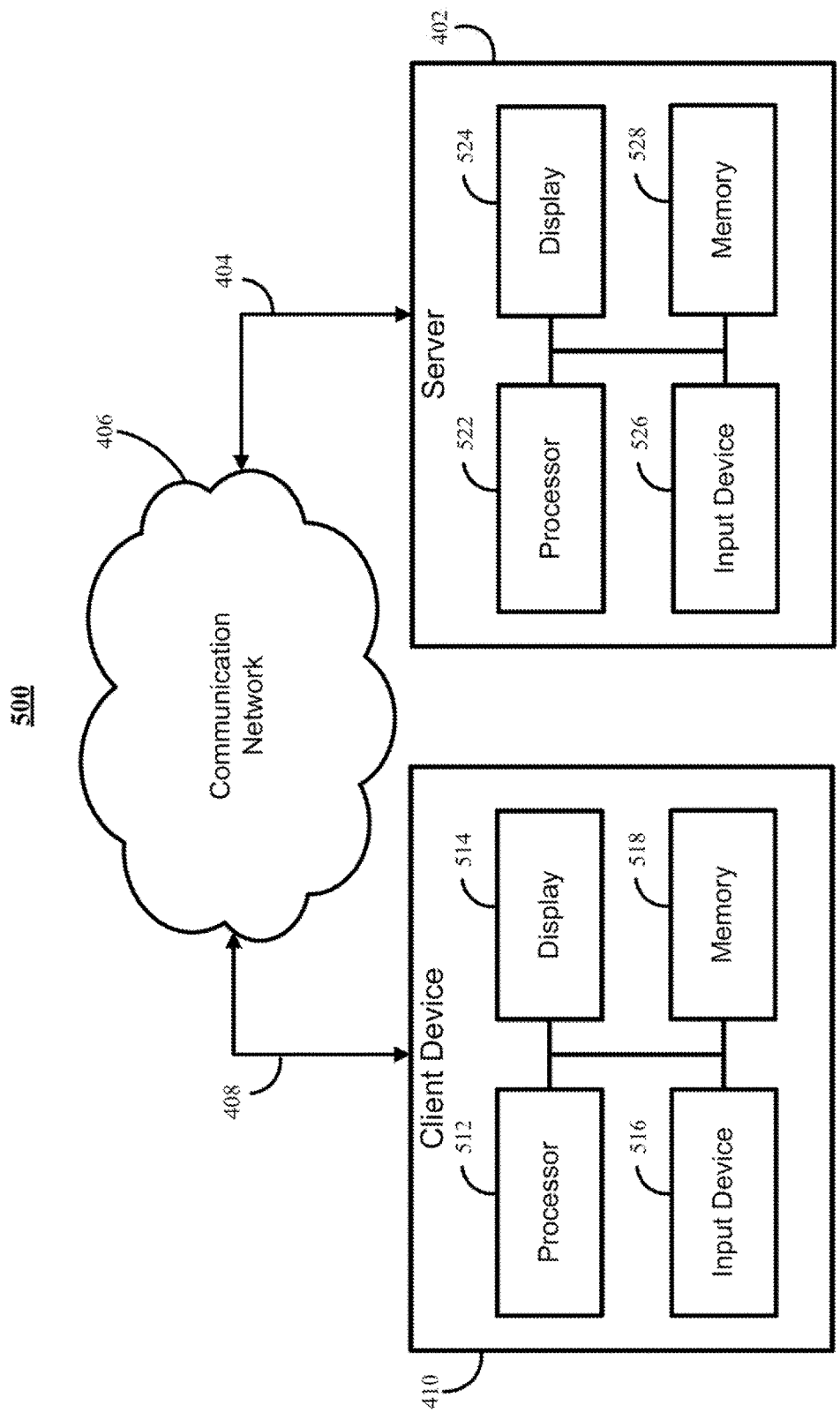
FIG. 5 shows a schematic diagram of an example of a server and one of the image capture devices of FIG. 4 that can be used in accordance with some implementations of the disclosed subject matter.

FIG. 5 illustrates an example 500 of hardware that can be used to implement server 402 and one of the client devices 410 depicted in FIG. 4 in accordance with some implementations of the disclosed subject matter. Referring to FIG. 5, client device 410 can include a hardware processor 512, a display 514, an input device 516, and memory 518, which can be interconnected. In some implementations, memory 518 can include a storage device (such as a non-transitory computer-readable medium) for storing a computer program for controlling hardware processor 512.

Hardware processor 512 can use the computer program to present on display 514 content and/or an interface that allows a user to, among other things, interact with the mechanisms described herein for providing content being executed by a device, such as server 402, and to send and receive data through communications link 408. Display 514 can be a flat panel display, a cathode ray tube display, a projector, a touch screen, a speaker(s), and/or any other suitable display and/or presentation devices. Input device 516 can be a computer keyboard, a computer mouse, a microphone, a touchpad, a voice recognition circuit, a touchscreen, and/or any other suitable input device.

Server 402 can include a hardware processor 522, a display 524, an input device 526, and memory 528, which can be interconnected. In some implementations, memory 528 can include a storage device for storing data received through communications link 404 or through other links. The storage device can further include a server program for controlling hardware processor 522.

Hardware processor 522 can use the server program to communicate with client devices 410, as well as provide access to and/or copies of the mechanisms described herein. Display 524 can be a flat panel display, a cathode ray tube display, a projector, a touch screen, a speaker(s), and/or any other suitable display and/or presentation devices. Input device 526 can be a computer keyboard, a computer mouse, a touchpad, a voice recognition circuit, a touchscreen, and/or any other suitable input device.

In some implementations, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the user input interface application. For instance, these mechanisms can encompass a computer program written in a programming language recognizable by client device 410 and/or server 402 that is executing the mechanisms (e.g., a program written in a programming language, such as, Java, C, Objective-C, C++, C#, JavaScript, Visual Basic, HTML, XML, Cold Fusion, any other suitable approaches, or any suitable combination thereof).

In situations in which the mechanisms described herein collect personal information about users, or can make use of personal information, the users can be provided with an opportunity to control whether programs or features collect user information (e.g., information about a user's social network, social actions or activities, profession, a user's preferences, or a user's current location), or to control whether and/or how to receive content from the content server that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by a content server.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 1 and 3 can be executed or performed in any order or sequence not limited to the order and sequence shown and described in the figures. Also, some of the above steps of the processes of FIGS. 1 and 3 can be executed or performed substantially simultaneously where appropriate or in parallel to reduce latency and processing times. Furthermore, it should be noted that FIGS. 1 and 3 are provided as examples only. At least some of the steps shown in these figures may be performed in a different order than represented, performed concurrently, or omitted.

It should also be noted that, as used herein, the term mechanism can encompass hardware, software, firmware, or any suitable combination thereof. The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for providing content are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for providing content, the method comprising:
receiving, using a hardware processor, a request from a first content provider on a content sharing platform to share, without further intervention from the first content provider, content items that are shared to the content sharing platform by a second content provider on the content sharing platform subsequent to receiving the request from the first content provider, wherein the first content provider is associated with a first user account on the content sharing platform and the second content provider is associated with a second user account on the content sharing platform;
setting, based on input from the first content provider, one or more content sharing parameters for determining what content from the second content provider is to be shared by the first content provider;
setting, based on input from the second content provider, one or more permission parameters for determining what content from the second content provider is allowed to be shared by the first content provider;
identifying a content item shared by the second content provider using the content sharing platform;
determining that the content item meets the one or more content sharing parameters and that the content item meets the one or more permission parameters;
receiving, from a client device associated with a third user account on the content sharing platform, a request for content shared by the first content provider; and
in response to determining that the content item meets the one or more content sharing parameters and that the content item meets the one or more permission parameters, and in response to receiving the request for content shared by the first content provider, presenting the content item to a user associated with the third user account on the content sharing platform, wherein the third user account is a subscriber of the first content provider and is not a subscriber of the second content provider.

2. The method of claim 1, wherein presenting the content item to the user further comprises presenting the content item based on the user associated with the third user account being a subscriber to content from the first content provider via the content sharing platform, wherein at least a portion of the content shared by the first content provider is automatically presented to users that subscribe to the first content provider via the content sharing platform.

3. The method of claim 1, wherein presenting the content item to the user further comprises presenting the content item based on the user visiting a web page of the content sharing platform associated with the first content provider.

4. The method of claim 1, wherein the content item is a video.

5. The method of claim 1, further comprising indicating to the user that the content item from the second content provider is being presented based on an affiliation between the first content provider and the second content provider established in response to the request from the first content provider to affiliate with the second content provider.

6. The method of claim 1, wherein the one or more parameters of the first content provider includes an indication of whether to share content provided by the second content provider with subscribers of the first content provider.

7. The method of claim 6, wherein the one or more parameters of the second content provider includes an indication of whether to provide content to be shared by the first content provider with subscribers of the first content provider.

8. The method of claim 6, wherein the one or more parameters of the second content provider includes an indication of content items to provide to the first content provider.

9. A system for providing content, the system comprising:
at least one hardware processor configured to:
receive a request from a first content provider on a content sharing platform to share, without further intervention from the first content provider, content items that are shared to the content sharing platform by a second content provider on the content sharing platform subsequent to receiving the request from the first content provider, wherein the first content provider is associated with a first user account on the content sharing platform and the second content provider is associated with a second user account on the content sharing platform;
set, based on input from the first content provider, one or more content sharing parameters for determining what content from the second content provider is to be shared by the first content provider;
set, based on input from the second content provider, one or more permission parameters for determining what content from the second content provider is allowed to be shared by the first content provider;
identify a content item shared by the second content provider using the content sharing platform;
determine that the content item meets the one or more content sharing parameters and that the content item meets the one or more permission parameters;
receive, from a client device associated with a third user account on the content sharing platform, a request for content shared by the first content provider; and
present the content item to a user associated with the third user account on the content sharing platform in response to determining that the content item meets the one or more content sharing parameters and that the content item meets the one or more permission parameters, and in response to receiving the request for content shared by the first content provider, wherein the third user account is a subscriber of the first content provider and is not a subscriber of the second content provider.

10. The system of claim 9, wherein the hardware processor is further configured to present the content item based on the user associated with the third user account being a subscriber to content from the first content provider via the content sharing platform, wherein at least a portion of the content shared by the first content provider is automatically presented to users that subscribe to the first content provider via the content sharing platform.

11. The system of claim 9, wherein the hardware processor is further configured to present the content item based on the user visiting a web page of the content sharing platform associated with the first content provider.

12. The system of claim 9, wherein the content item is a video.

13. The system of claim 9, wherein the hardware processor is further configured to indicate to the user that the content item from the second content provider is being presented based on an affiliation between the first content provider and the second content provider established in response to the request from the first content provider to affiliate with the second content provider.

14. The system of claim 9, wherein the one or more parameters of the first content provider includes an indication of whether to share content provided by the second content provider with subscribers of the first content provider.

15. The system of claim 14, wherein the one or more parameters of the second content provider includes an indication of whether to provide content to be shared by the first content provider with subscribers of the first content provider.

16. The system of claim 14, wherein the one or more parameters of the second content provider includes an indication of content items to provide to the first content provider.

17. A non-transitory computer-readable medium containing computer executable instructions that, when executed by a processor, cause the processor to perform a method for providing content, the method comprising:
 receiving a request from a first content provider on a content sharing platform to share, without further intervention from the first content provider, content items that are shared to the content sharing platform by a second content provider on the content sharing platform subsequent to receiving the request from the first content provider, wherein the first content provider is associated with a first user account on the content sharing platform and the second content provider is associated with a second user account on the content sharing platform;
 setting, based on input from the first content provider, one or more content sharing parameters for determining what content from the second content provider is to be shared by the first content provider;
 setting, based on input from the second content provider, one or more permission parameters for determining what content from the second content provider is allowed to be shared by the first content provider;
 identifying a content item shared by the second content provider using the content sharing platform;
 determining that the content item meets the one or more content sharing parameters and that the content item meets the one or more permission parameters;
 receiving, from a client device associated with a third user account on the content sharing platform, a request for content shared by the first content provider; and
 in response to determining that the content item meets the one or more content sharing parameters and that the content item meets the one or more permission parameters, and in response to receiving the request for content shared by the first content provider, presenting the content item to a user associated with the third user account on the content sharing platform, wherein the third user account is a subscriber of the first content provider and is not a subscriber of the second content provider.

18. The non-transitory computer-readable medium of claim 17, wherein presenting the content item to the user further comprises presenting the content item based on the user associated with the third user account subscribing to content from the first content provider via the content sharing platform, wherein at least a portion of the content shared by the first content provider is automatically presented to users that subscribe to the first content provider via the content sharing platform.

19. The non-transitory computer-readable medium of claim 17, wherein presenting the content item to the user further comprises presenting the content item based on the user visiting a web page of the content sharing platform associated with the first content provider.

20. The non-transitory computer-readable medium of claim 17, wherein the content item is a video.

21. The non-transitory computer-readable medium of claim 17, the method further comprising indicating to the user that the content item from the second content provider is being presented based on an affiliation between the first content provider and the second content provider established in response to the request from the first content provider to affiliate with the second content provider.

22. The non-transitory computer-readable medium of claim 17, wherein the one or more parameters of the first content provider includes an indication of whether to share content provided by the second content provider with subscribers of the first content provider.

23. The non-transitory computer-readable medium of claim 22, wherein the one or more parameters of the second content provider includes an indication of whether to provide content be shared by the first content provider with subscribers of the first content provider.

24. The non-transitory computer-readable medium of claim 22, wherein the one or more parameters of the second content provider includes an indication of content items to provide to the first content provider.

* * * * *